United States Patent
Khan et al.

(10) Patent No.: US 7,426,290 B1
(45) Date of Patent: Sep. 16, 2008

(54) NONPARAMETRIC METHOD FOR DETECTION AND IDENTIFICATION OF REGIONS OF CONCERN IN MULTIDIMENSIONAL INTENSITY IMAGES

(75) Inventors: Fyzodeen Khan, North Kingstown, RI (US); Ashwin Sarma, North Kingstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 762 days.

(21) Appl. No.: 10/885,531

(22) Filed: Jun. 29, 2004

Related U.S. Application Data

(60) Provisional application No. 60/484,574, filed on Jul. 2, 2003.

(51) Int. Cl.
*G06K 9/00* (2006.01)
*A61B 6/04* (2006.01)

(52) U.S. Cl. .................... 382/132; 382/190; 382/288; 378/37

(58) Field of Classification Search ................. None
See application file for complete search history.

(56) References Cited

U.S. PATENT DOCUMENTS 6,310,967 B1   10/2001   Heine et al.
6,430,427 B1   8/2002    Lee et al.
6,577,762 B1   6/2003    Seeger et al.
6,608,929 B1   8/2003    Shiratani

OTHER PUBLICATIONS

"Mass Detection Using Tolerance Intervals and a Rank Detector" by Khan et al., Biomedical Imaging, 2002. Proceedings. 2002 IEEE International Symposium on Jul. 7-10, 2002 pp. 185-188.*
J. Roehring, and R.A. Castellino, "The Promise of Computer Aided Detection in Digital Mammography,"Journal, Mar. 25, 1999, pp. 35-39,vol. 31, European Journal of Radiology, Las Altos, USA.
L.J.W. Burhenne et al., "Potential Contribution of Computer-Aided Detection to the Sensitivity of Screening Mammography," Article, May 2000, pp. 554-562, vol. 215, No. 2, Radiology, Vancouver, Canada.
S.S.Wilks, "Determination of Sample Sizes for Setting Tolerance Limits," paper, 1941, pp. 91-96, vol. 12, The Annals of Mathematical Studies, USA.

(Continued)

*Primary Examiner*—Bhavesh M. Mehta
*Assistant Examiner*—Charles Kim
(74) *Attorney, Agent, or Firm*—James M. Kasischke; Michael P. Stanley; Jean-Paul A. Nasser

(57) ABSTRACT

A method for detection and identification of regions of concern in multidimensional intensity images using a template and a nonparametric test is presented. Data corresponding to background intensity is extracted from the outer region of the template while data for mass detection is extracted from the inner region. The statistical nature of the background intensity, specifically the tail structure of the unknown distribution, is estimated via tolerance intervals. Mass detection is based on the fraction of test data within the tail structure.

16 Claims, 6 Drawing Sheets

OTHER PUBLICATIONS

S.S. Wilks, "Statistical Prediction with Special Reference to the Problem of Tolerance Limits," paper, 1942, pp. 400-409, vol. 13, The Annals of Mathematical Studies, USA.

A. Wald, "An Extension of Wilks' Method for Setting Tolerance Limits," paper, 1943, pp. 45-55, vol. 14, The Annals of Mathematical Studies, USA.

H. Scheffe and J.W. Tukey, "Non-Parametric Extimation I Validation of Order Statistics," paper, 1945, pp. 187-192, vol. 16, The Annals of Mathematical Statistics, USA.

R.L. Streit and T.E. Luginbuhl, "Maximum Likelihood Training of Probabilistic Neural Networks," Journal, Sep. 5, 1994, pp. 764-783, vol. 5, No. 5, IEEE, USA.

E.C. Real et al., "Comparison of Two Methods for Multispectral 3-D Detection of Single Pixel Features in Strong Textured Clutter", Conference, Jul. 12-17, 1998, IEEE, Alpbach, Austria.

E. C. Real, et al., "Estimation of Prescribed False Alarm Rate Thresholds from Local Data Using Tolerance Intervals", Journal, Jan. 1999, pp. 8-10, vol. 6, No. 1, IEEE, USA.

A. Sarma et al., "Robust Adaptive Threshold for Control of False Alarms," Journal, Sep. 2001, pp. 261-263, vol. 8, No. 9, IEEE, USA.

J. Suckling, "The Mammographic Image Analysis Society Digital Mammogram Database," paper, 1994, pp. 375-378, Elsevier Science, BV, Amsterdam, Netherlands.

G.M. teBrake et al., "Single and Multiscale Detection of Masses in Digital Mammograms," Journal, Jul. 1999, pp. 628-639, vol. 18, No. 7, IEEE, USA.

Ioanna Christoyianni et al., "Fast Detection of Masses in Computer-Aided mammography," Article, Jan. 2000, pp. 54-64, IEEE Signal Processing Magazine, USA.

Shih-Chung B. Lo et al., "A Multiple Circular Path Convolution Neural Network System for Detection of Mammographic Masses," Journal, Feb. 2002, pp. 150-158, vol. 21, No. 2, IEEE Transactions on Medical Imaging, USA.

* cited by examiner

NONPARAMETRIC METHOD FOR DETECTION AND IDENTIFICATION OF REGIONS OF CONCERN IN MULTIDIMENSIONAL INTENSITY IMAGES

This application claims the benefit of U.S. Provisional Application No. 60/484,574, filed Jul. 2, 2003 and which is entitled NONPARAMETRIC METHOD FOR DETECTION AND IDENTIFICATION OF REGIONS OF CONCERN IN MULTIDIMENSIONAL INTENSITY IMAGES by Fyzodeen Khan and Ashwin Sarma.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a method for identifying regions in any intensity image (such as a mammogram) that correspond to an approximately known shape in which the regions stand out with a higher intensity with respect to a local background. The size of the region need only be known to within a range.

(2) Description of the Prior Art

It is known in the art that false negatives, those cancers missed during reading, can be attributed to the necessity of viewing large numbers of mammograms, the complex structure of the breast, the subtle nature of certain mammographic characteristics of breast cancer and fatigue or distraction. Some studies have indicated a potential increase of 4 to 15% in the number of breast cancers detected using a double reading of screening mammograms. Computer-aided detection is not intended to replace the medical judgment of a radiologist but has the potential to help the radiologist with a consistent, high level of attention in all cases (See J. Roehrig, and R. A. Castellino, "The Promise of Computer Aided Detection in Digital Mammography" European Journal of Radiology, 31, pp 35-39; 1999 and L. J. W. Burhenne et al., "Potential Contribution of Computer-Aided Detection to the Sensitivity of Screening Mammography" Radiology, 215(2), pp. 554-562, May 2000).

Computer-aided methods for detection of breast cancer often rely on artificial neural networks or ANNs (See I. Christoyianni, E. Dermatas, G. Kokkinakis, "Fast Detection of Masses in Computer-Aided Mammography," IEEE Signal Processing Magazine, 17, pp 54-64, January 2000 and S. C. B Lo, H. Li, Y. Wang, L. Kinnard, M. T. Freedman, "A Multiple Circular Path Convolution Neural Network for Detection of Mammographic Masses," IEEE Transactions on Medical Imaging, 21 (2), pp 150-158, February 2002; both incorporated herein by reference) These computer-aided methods require data for training in which the data must statistically match the actual mammogram data on which the computer-aided method is to be applied.

Artificial neural networks also involve nonlinear optimization, a computationally intensive procedure that does not guarantee achieving the best solution. Artificial neural networks thus utilize no statistical modeling and thus are capable of "overtraining", i.e. achieving near perfect performance on the training set but poor generalization performance on the actual data to be tested. This overtraining cannot be controlled.

In Heine et al. (U.S. Pat. No. 6,310,967), there is disclosed a method for identifying calcifications in mammograms. The method uses wavelet decomposition to determine multi-resolution information by applying parametric or nonparametric (kernel based) statistical modeling to the wavelet decomposed from a training set. The models are then used to empirically determine thresholds for detection; however, identifying calcifications in a mammogram (a pre-cancerous condition) is a different type of detected abnormality than a mass (a cluster of cancer cells that keeps growing) in a mammogram.

In Lee et al. (U.S. Pat. No. 6,430,427), there is provided a method to estimate the trabecular index and bone mineral density. The focus of this deterministic method is on an estimation of a quantity rather than a region of concern.

In Seeger et al. (U.S. Pat. No. 6,577,762), there is provided a method to generate a background image of a pixmap image, which can then be used for additional image processing on the pixmap, such as identification of an image foreground. The determination of the background pixels in an image immediately determines the foreground pixels. The method uses empirical rules to determine the thresholds necessary for determining the background with the threshold surface a linear function of estimated background variances. The method does not directly account for the statistical nature of the background, specifically in distribution.

In Shiratani (U.S. Pat. No. 6,608,929), there is an apparatus for segmenting an image into plural regions according to feature (color) quantities of pixels. Use of image segmentation is different from detection of regions of interest from a background. For example, the regions of interest in mammograms are not homogeneous in intensity. Image segmentation algorithms are designed to segment such a region, not to identify it as a region of interest.

In view of the above, there is a need for a method to detect masses (potentially cancerous regions) in two-dimensional mammograms as abnormalities. The structure of the method can also be used to identify calcifications in mammograms. Specifically, the apriori choices of template sizes and shapes would decompose the image into regions of interest at various scales without the direct use of training sets. Nonparametric tolerance intervals would allow thresholds to be determined based on the current data in an image with the thresholds determined as a stochastic method by accounting for the statistical variability in the original space of pixel intensities, as opposed to wavelet transformed space.

SUMMARY OF THE INVENTION

Accordingly, it is a general purpose and primary object of the present invention to provide a method to identify regions of interest in any intensity image that correspond to an approximately known specific shape and stand out by higher intensity with respect to a local background in which the size of the region need only be known to within a range.

It is a further purpose of the present invention to provide a method for detecting potentially cancerous regions in mammograms.

To attain the objects described, there is provided a method to locally model image intensity variations statistically using distribution free (DF) methods. DF methods are chosen since image intensity levels vary in an unpredictable manner. Also, DF methods are useful when no reliable information is available about the underlying probability density function (pdf). DF methods based on nonparametric tolerance intervals have been developed as originally applied to inspection and quality control, and prediction of production processes (See S. S.

Wilks, "Determination of Sample Sizes for Setting Tolerance Limits," The Annals of Mathematical Statistics, 12, pp 91-96, 1941; S. S. Wilks, "Statistical Prediction with Special References to the Problem of Tolerance Limits" The Annals of Mathematical Statistics, 13, pp 400-409, 1942; A. Wald, "An Extension of Wilk's Method for Setting Tolerance Limits," The Annals of Mathematical Statistics, 14, pp 45-55, 1943; H. Scheffe and J. W. Tukey "Non-Parametric Estimation I Validation of Order Statistics," The Annals of Mathematical Statistics, 16, pp 187-192, 1945; all incorporated herein by reference)

Tolerance intervals have been applied in different areas from analysis of classification schemes (See R. L. Streit and T. E. Luginbuhl, "Maximum Likelihood Training of Probabilistic Neural Networks," IEEE Transactions on Neural Networks, 5(5), pp 764-783, September 1994; incorporated herein by reference) and detection schemes (See E. C. Real, R. M. Yannone and D. W. Tufts, "Comparison of Two Methods for Multispectral 3-D Detection of Single Pixel Features in Strong Textured Clutter," IEEE IMDSP' 98 3-D Image Processing Conference, Alpach, Austria Jul. 12-17, 1998; incorporated herein by reference) to constant false alarm rate detection (See E. C. Real and D. W. Tufts, "Estimation of Prescribed False Alarm Rate Thresholds from Local Data Using Tolerance Intervals," IEEE Signal Processing Letters 6(1), pp. 8-10, January 1999 and A. Sarma and D. W. Tufts, "Robust Adaptive Threshold for Control of False Alarms, 8(9), pp. 261-263, September 2001; both incorporated herein by reference).

The method of the present invention utilizes a multi-resolution algorithm in which the template size defines the size of objects to identify within the image and the number of templates gives the number of different resolutions (sizes) that can be identified. For a given template, an inner and outer region is included in which a set of data points are assigned to each region. For each of the templates, the template tessellates an image in alternate two-dimensional directions.

Threshold estimation (computed on the basis of outer region data points) is done locally within the image using the statistical technique of nonparametric tolerance intervals. A normalized threshold crossing rate based on data points of the inner region is used in a rank order detector.

A centroid of threshold crossings of the data points of the inner region is computed in relation to the estimated threshold such that false negatives and false positives of the threshold crossing rates are determined.

The threshold-crossing rates are ranked in ascending order such that each rank represents a region, ensuring the centroids correspond to the sorted crossing rates. These regions are agglomerated to form regions of concern. The data is then displayed to the user. The number of regions of concern that may be displayed to a user or output to subsequent processing is under user control.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

For the method, a description is given for two-dimensional data but the method can be extendable to more than two dimensions. The user-provided algorithm parameters which define templates and the associated parameters for processing in the steps of the method are:

a. type 1 error (or probability of false alarm, pfa)
b. confidence level, $\alpha$
c. number of templates, $N_T$
d. size of inner regions in each of the $N_T$ templates
e. shape of $N_T$ templates in which the shape of each template can be the same as each other or can be different.
f. number of data points in outer regions of the $N_T$ templates, $N_{OR}$
g. number of data points in inner region of the $N_T$ templates, $N_{IR}$
h. maximum number of ranks of the pooled data sets, $\tau_r$
i. the number of data points to skip in the x-direction and a function of the template, $S_x$
j. the number of data points to skip in the y-direction and a function of the template, $S_y$
k. the maximum distance for clustering, $d_{max}$ In the method, the provided data is processed using the $N_T$ templates. For two-dimensional data, skip $S_x$ and $S_y$ data points in each direction. All points in the data can be processed in which case the number of data points skipped is zero.

Data is processed by first specifying the shape and size of the $N_T$ templates. At each data point to be processed, compute a threshold for each template, compute the normalized threshold-crossing rate for each template, compute the centroid of the threshold crossings for each template, rank order and cluster (agglomerate). These computations as described in detail below may be accomplished by computer programs known in the art.

A first example is described for digitized film-screen mammograms or digitized mammograms. Abnormal tissue regions, typical of abnormal tissue regions in digitized film-screen mammograms or digitized mammograms are viewed as having higher intensity levels than the surrounding normal tissue. The abnormal tissue regions are considered as coming from the alternative hypothesis H1. Normal tissue is considered as belonging to the null hypothesis H0.

Figure 1:
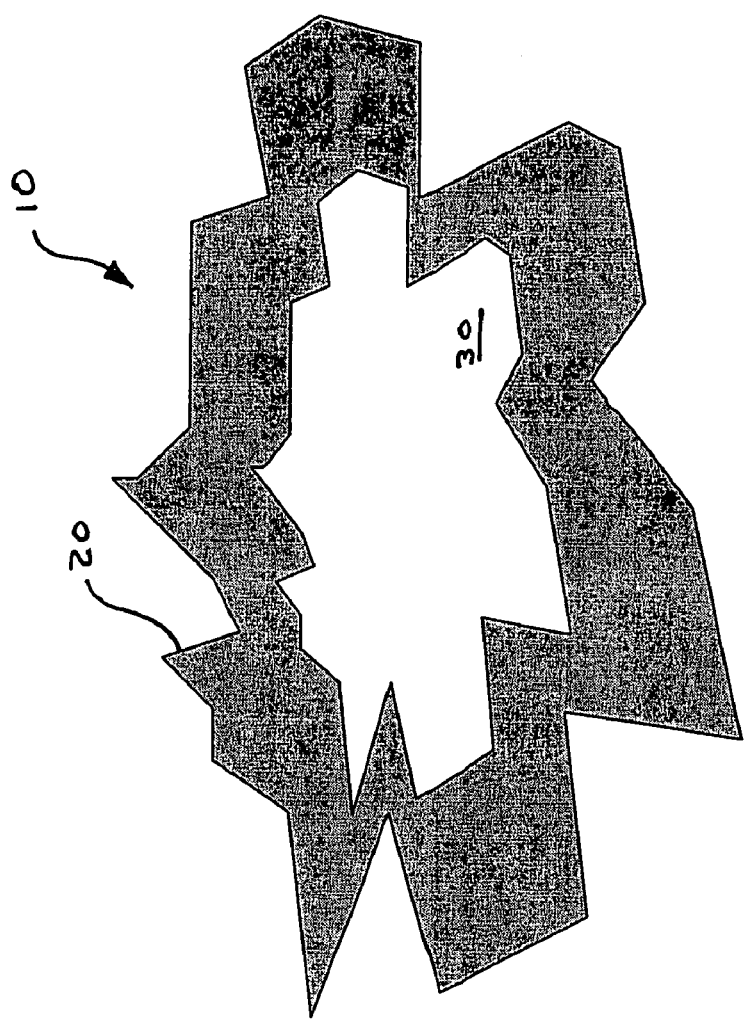
FIG. 1 depicts an example template with inner and outer regions with an arbitrary shape.

Referring to FIG. 1 and successive figures where like numerals refer to like elements throughout the several views, one sees that the figure depicts a template 10 for the method with an arbitrary shape of an outer region 20 and an inner region 30. Templates can have geometrical shapes such as circles (See the second example below as described in conjunction with FIGS. 3 and 4) or the templates can also have a shape matched to a specific morphology such as finding abnormal regions within mammograms.

As noted above, the template 10 includes two disjoint regions, the outer region (OR) 20 (so identified for the purpose of the algorithms used with $N_{OR}$ data points) and the inner region (IR) 30 (so identified for the purpose of the algorithms used with $N_{IR}$ data points). Data within the outer region 20 serves as local background coming from the null hypothesis HO whereas data within the inner region 30 serves as test data coming from the alternative H1.

The outer region 20 is designed to have a minimum of $N_{OR}$ data points for each of the $N_T$ different templates (the number of data points $N_{OR}$ in the outer region is a design parameter set by the user to provide enough accuracy in the estimate of the threshold. This number directly affects the estimation of the threshold, since the threshold is a function of $N_{OR}$ as seen in the equations below). The inner region 30 has $N_{IR}$ data points for each of the $N_T$ different templates. Thus for the $N_T$ templates there are $N_T$ pairs ($N_{OR}$, $N_{IR}$).

Figure 2:
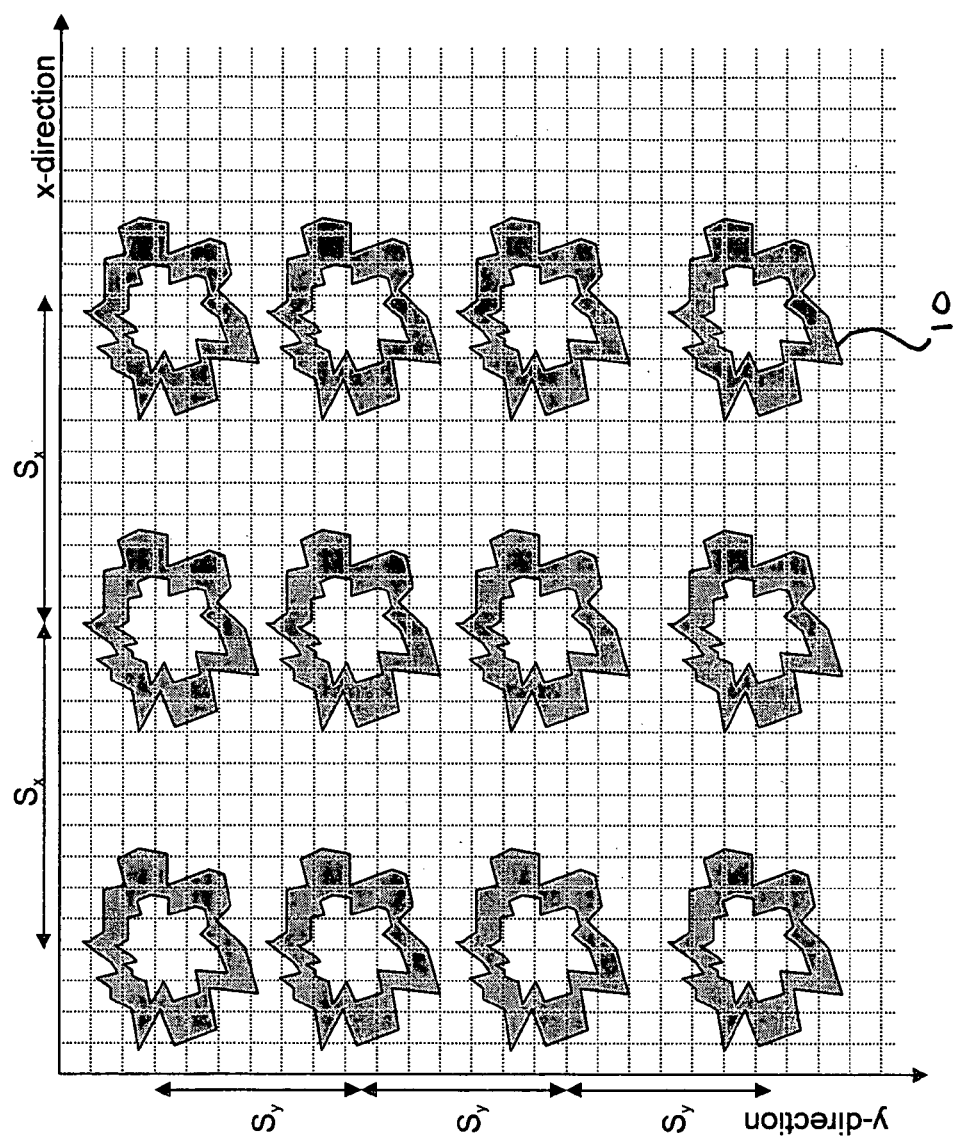
FIG. 2 depicts an example of how the template of FIG. 1 skips the $S_x$ and $S_y$ data points (as described below) as the template moves from one location to another in an image ($S_x$ and $S_y$ are such that the templates overlap in each direction, but are not shown for clarity)

Referring now to FIG. 2, for each of the specified templates, process the digitized image in the x-y directions skipping $S_x$ and $S_y$ data points in each direction respectively. The figure depicts how the template 10 may tessellate an image. At each new location with the image, compute a threshold, normalized crossing rate and centroid of all threshold crossings within the inner region 30.

In the step of threshold estimation, data coming from a tail (of the probability density function, pdf, which describes the background statistics at each location in the image) forms a one-sided interval in which the left endpoint of the interval acts as a threshold. The algorithm tracks variations in data statistically using Tolerance Intervals (TI). The template 10 conforming to a desired shape containing two disjoint regions is used and tessellates the image, skipping data points in each direction, as described above. At each location, the variation in the data is estimated. Statistical variation of the local background data is characterized by estimating the tail of the unknown local pdf. A threshold is then computed as follows:

Let $X=\{X_1, X_2, \ldots, X_{N_{OR}}\}$ represent the data points that are in the outer region 20 of the template 10 at some location (x, y) in the image. Denote the $q^{th}$ order statistic as $X_{(q)}$ where $\{X_{(1)}, X_{(2)}, \ldots, X_{(N_{OR})}\}$ is the data set, sorted in ascending order.

A one-sided interval based on the order statistic $X_{(q)}$ is constructed such that there is $100\alpha\%$ confidence that the probability mass within the interval is $\leq$pfa. This is the q that solves $$\min_q \left\{ \alpha \geq 1 - \sum_{k=0}^{q-1} \binom{N_{OR}}{k} (1-pfa)^k pfa^{N_{OR}-k} \right\} \quad (1)$$

This is repeated at each location in the image using $N_T$ templates. For each template, there are $M_j$, j=1, . . . , $N_T$ locations processed in the image (where "M" is the number of regions processed in the image when any one of the $N_T$ different templates is used. Since there are more than one template, the notation $M_j$ is used to identify the number of regions processed by the $j^{th}$ template of the set of templates where "j" means any of the templates, no one template in particular. This would be evident to one skilled in the art of implementing algorithms). For example, $M_5$ locations within the image are processed with the fifth of the $N_T$ templates, etc.

In the step of determining the normalized threshold-crossing rate, the normalized threshold-crossing rate is the ratio of the numbers of data points within the inner region 30 greater than or equal to the threshold to the area of the inner region 30. This is defined as follows.

Let $Y=\{Y_1, Y_2, \ldots Y_{N_{IR}}\}$ represent the all data points that are within the inner region 30 of the template at some location (x, y) in the image. The total number of data points within the inner region 30 is its area. Denote the area of the $j^{th}$ of the $N_t$ templates defined as $A_j$. The normalized threshold crossing rate for the $j^{th}$ of the $N_t$ templates, defined as $C_j$, is $$C_j = \frac{1}{A_j} \sum_{k=1}^{N_{IR}} D(Y_k \geq X_{(q)}) \quad (2)$$

where $D(\bullet)$ is a binary decision variable defined as $$D(Y_k \geq X_{(q)}) = \begin{cases} 1 \text{ if } Y_k \geq X_{(q)} \\ 0 \text{ if } Y_k < X_{(q)} \end{cases} \quad (3)$$

Thus at location (x, y) in the image for the $j^{th}$ template: extract all the data points in the inner region 30 where the template is centered, find the number of these data points that are larger than or equal to the corresponding threshold that was computed for this location and divide this number by the area of the inner region 30 of the template. This procedure is repeated for all $M_j$ locations in the image for the $j^{th}$ template, j=1, . . . , $N_T$. Dividing by the area results in a normalized threshold crossing rate making it invariant to the size of the template.

For computing the centroid (center of mass) of the threshold crossings, $(x,y)^c$, of all the data points within % the inner region 30 crossing the threshold, as described above, is computed for all the (x, y) locations of the inner region 30 of the $N_T$ templates. Thus for the $j^{th}$ template, there are $M_j$ centroids, j=1, . . . , $N_T$.

At this point, $N_T$ sets of thresholds, normalized threshold crossing rates and centroids are available for the image being analyzed.

In a further step of the method, a ranked set is formed by pooling all $N_T$ sets of normalized threshold crossing rates and sorting them in ascending order. When doing so, ensure that the pooled centroids correspond to the sorted normalized crossing rates. Each of the ranks identifies a region—the inner region 30 of the template 10 of that was used and resulted in that rank.

Before displaying or before additional processing, cluster (agglomerate) the $\tau_r$ highest ranked regions. Localized regions within an image can produce more than one highly ranked crossing rate. For example, adjacent data points in an image (for a given template) may all be within the $\tau_r$ highest ranks.

Also for different templates, crossing rates coming from the same region within the image may also be highly ranked. Highly ranked crossing rates that are located within same regions within the image are agglomerated using a decision rule. The decision rule starts at the highest ranked region and sequentially moves down to the lower ranks using a maximum distance ($d_{max}$) rule. At the highest rank, if any of the other $\tau_r-1$ centroids are within the Euclidian distance $d \leq d_{max}$ of the centroid of the highest ranked, the centroids are labeled as belonging to the same region, the one with the highest rank (Distance is measured between the centroids of the regions).

The highest ranked region and its centroid is kept and the others (within $d_{max}$) are pruned or removed. This procedure is repeated for the remaining ranks. At the end of this procedure, the agglomerated ranks identify a set of regions, each separated by a distance $d_{max}$.

The agglomerated regions are displayed to a user as the inner region of the corresponding templates of the agglomerated set. The original image is displayed with an overlay of these regions. The processed image identifies the highly ranked agglomerated regions.

In the study of digitized film-screen mammograms, the following parameters can be used as a default set; however, a study can refer to any study one may wish to do on mammograms using this algorithm. In conducting a study, the user will need to have values for the parameters of the algorithm. For this default set, the templates are circles, both the inner region and the outer region; however, the templates employed are up to the user.

a. type 1 error (or probability of false alarm, pfa)=0.2
b. confidence level, α=0.99
c. number of templates, $N_T$=20
d. shape of $N_T$ templates in which the shape of the inner region and the outer region are circles.
e. size of inner regions in each of the $N_T$ templates has a radius that ranges from 1 millimeter to 20 millimeters in steps of 1 millimeter
f. $N_{OR}$, number of data points in outer regions of the $N_T$ templates is 1000.
g. $N_{IR}$, number of data points in inner region of the $N_T$ templates is a function of the radius given above and how the data is discretized.
h. maximum number of ranks of the pooled data, $\tau_r$, is a user input and is dependant on the number of regions that the user wishes to display.
i. $S_x$, the number of data points to skip in the x-direction is one quarter the radius of the inner region.
j. $S_y$, the number of data points to skip in the y-direction is equal to $S_x$.
k. $d_{max}$, the maximum distance for clustering is equal to the radius of the inner region of the circular template corresponding to the highest rank in the clustering.

A user may have a Graphical User Interface (GUI) where the above parameters are at the discretion of the user. As such, all parameters can be changed and the image reprocessed to identify regions of interest within the image.

Figure 3:
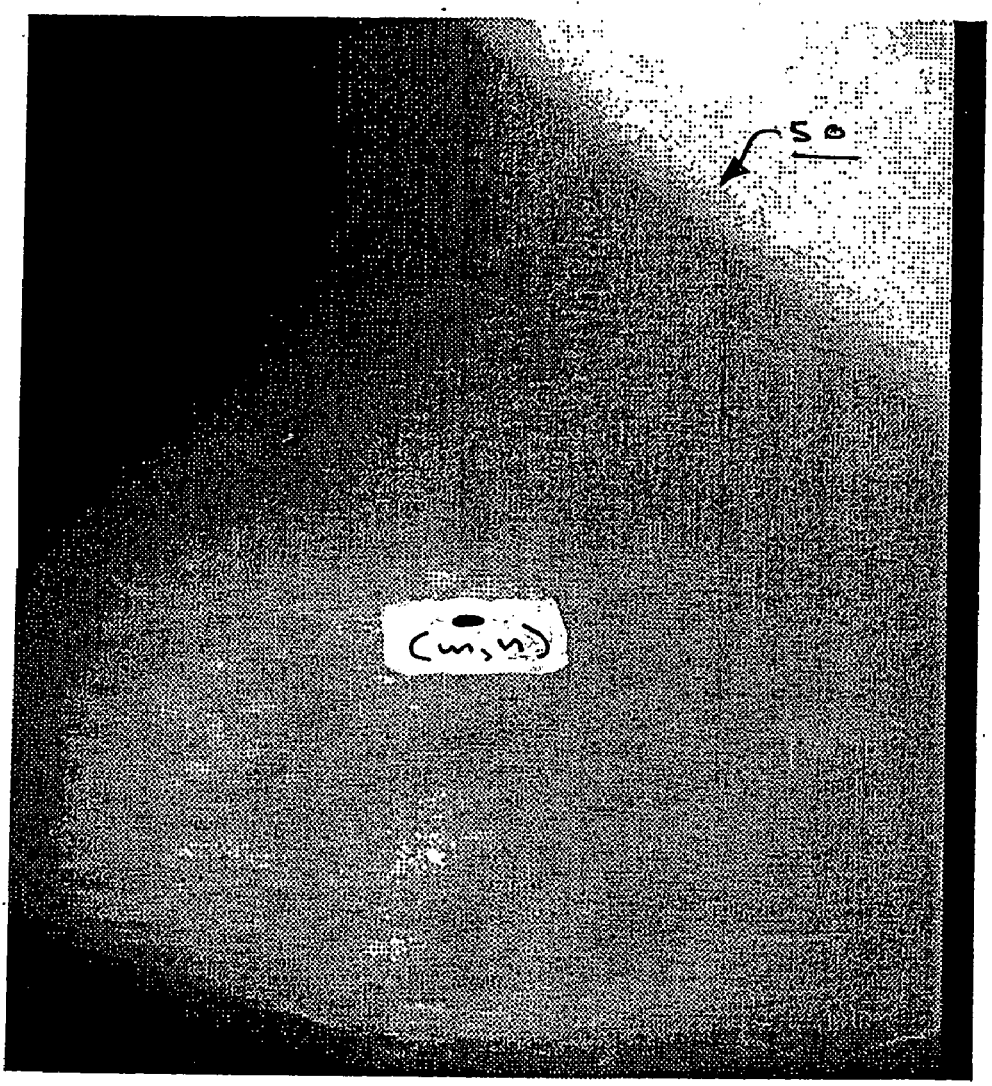
FIG. 3 depicts a mammogram image containing a benign asymmetric mass in a dense background with a central portion of the figure blank to clarify the labeling of location (m,n)
Figure 4:
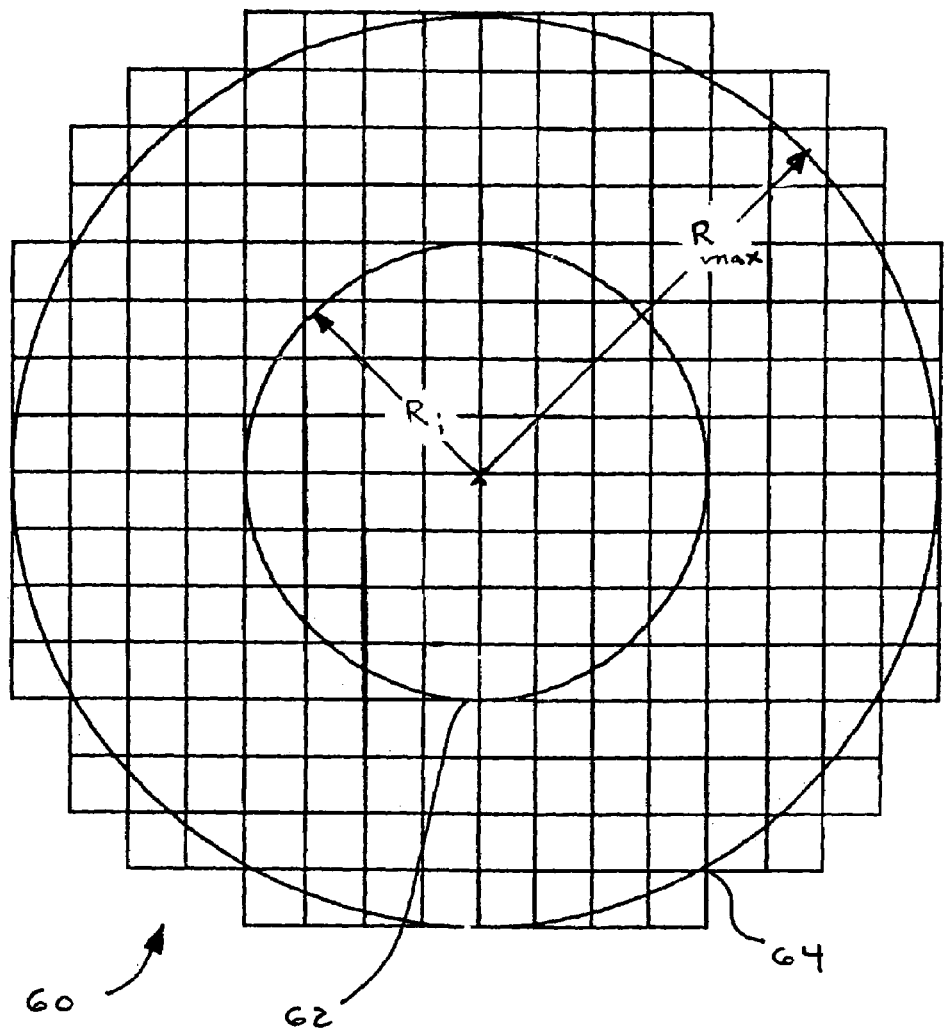
FIG. 4 depicts a circular template (relative to FIG. 3) with an inner disk where testing data is obtained and an outer ring where training data is obtained and a detection threshold ($\tau$) is computed.

In a second illustrative example, consider the depiction of FIG. 3 which represents a mammogram in which the mammogram contains a benign, asymmetric mass 50 in a dense background. By using the method of the present invention, locations (m, n) are designated within the image. At each location (m, n) within the image, a circular template 60 of FIG. 4 is centered with an inner disk or region 62 and outer ring or region 64 of the second illustrative example. Pixels within the outer ring 64 are used to form a detection threshold. Pixels within the inner disk 62 are tested to determine if the pixels cross the threshold. The number of pixels crossing the threshold is the decision metric for location (m, n). This continues for all the pixels in the image. These crossing rates are then sorted and a subset of the largest ones is kept. Circles, with the radius the same as the inner disk 62 of the template 60, are then overlayed on the image, centered at the locations corresponding to the subset of the largest crossing rates.

The circular template 60 of FIG. 4 specifies a simple morphological shape with two disjoint regions, the inner circular disk 62 with radius $R_i$, and the outer ring 64 with radius ranging from $R_i$ to $R_{max}$. $R_{max}$ is adjusted appropriately to give $N_{OR}$ values within the ring 62 defined by [$R_i, \ldots, R_{max}$].

The number of data points in the inner disk 62 is denoted by $N_{IR}$.

For threshold estimation, let $X=\{X_1 X_2, \ldots, X_{N_{OR}}\}$ represent the set of $N_{OR}$ samples drawn from the outer ring 64 of the template 60 centered at location (m, n). This data reflects the local background statistics. Denote the $q^{th}$ order statistic as $X_{(q)}$ where $\{X_{(1)} < X_{(2)} < \ldots < X_{(N_{OR})}\}$.

The statistical structure of local background data is characterized by estimating the tail of the unknown local distribution. Deviations within the region of the inner disk 62 from local background statistics due to pixels with higher intensities are of interest. A right-sided interval based on the order statistic $X_{(q)}$ is constructed such that there is 100α% confidence that the probability mass is $\leq pfa_d$. This q is given by:

$$\min_q \left\{ \alpha \geq 1 - \sum_{k=0}^{q-1} \binom{N_{OR}}{k} (1 - pfa_d)^k pfa_d^{N_{OR}-k} \right\} \quad (4)$$

If $\tau = X_{(q)}$, q is given by equation (4), is viewed as a detection threshold, then the probability mass, $pfa_d$, contained within the right-sided interval can be viewed as a probability of false alarm (pfa). Threshold τ is a function only of the parameters α, $pfa_d$, and $N_{OR}$. τ is applied to each pixel within the inner region and is recomputed at each pixel location (m, n). The template tessellates the image at intervals of $R_i/4$ (=$S_x$, $S_y$) to reduce processing time. The total number of pixels processed is N.

For rank detection, let $Y=\{Y_1, Y_2, \ldots, Y_{N_{IR}}\}$ represent the testing data from the inner disk 62 at location (m, n) and M, the pixel crossing rate within the inner disk i.e. $M \leq N_{IR}$ is the number of pixels crossing τ at location (m, n). There are N such M.

To identify a region as belonging to a mass, a subset of the N pixel crossing rates are used. Ideally, when the inner disk 62, with radius matched to a circular mass, contains higher pixel intensity than those within the outer ring 64, the pixel crossing rate should be high. Therefore the higher pixel crossing rates should correspond to masses or regions with high pixel intensities within the mammogram. All pixel crossing rates are ranked, $M_{(1)} < M_{(2)} < \ldots < M_{(N)}$ (with locations (m, n)$_{(k)}$, $1 \leq k \leq N$), and analyzed to determine which are false positive or negative.

For empirical performance estimation, sensitivity (S) or True Positive Rate (TPR) and False Positive Rate (FPR) are computed, starting with the highest ranked value $M_{(N)}$. Since there are N ranks to test, only the largest $\tau_r$ ranks are tested. These $M_{(N-\tau_r+1)} \leq \ldots \leq M_{(N)}$ crossing rates and corresponding locations are tested as follows.

At location $(m,n)_{(s)}$, $N-\tau_r+1 \leq s \leq N$, a circular region of radius $R_i$ is centered and the centroid $(m,n)_{(s)}^c$ of the detections within its boundary is computed. If the distance, d, between the centroid and the lesion center $m_0, n_0$ (as defined in the database) is less than $R_i$, i.e. $d \leq R_i$, the region is labeled as belonging to the lesion, a TP, else it is labeled a FP. Sensitivity S and FPR are the averages of the TP and FP (respectively) over all images and are combined to form Receiver Operating Characteristic (ROC) curves. One conventionally used performance measure based on the ROC curve is $A_z$. It is the area under the ROC curve.

Images from the Mammographic Image Analysis Society (MIAS) database are used in the analysis (See J. Suckling, "The Mammographic Image Analysis Society Digital Mammogram Database," Excerpta Medica, Intl Congress Series, 1069, pp 375-378, 1994; incorporated herein by reference) Each image is 1024×1024 pixels with a 0.2 mm pixel edge. The database contains six different types of abnormalities: circumscribed masses, speculated, miscellaneous ill-defined, asymmetric, architectural distortions, and calcifications. The background type is either fatty (F), fatty-glandular (G) or dense glandular (D). The database also contains the mass severity (malignant or benign), location and size.

Since an objective is to determine how well the detector performs on a variety of small abnormalities, it has been shown that matching scale (mass radius) to the template radius gives the best ROC performance (See G. M. teBrake and N. Karssemeijer, "Single and Multiscale Detection of Masses in Digital Mammograms," IEEE Trans. Medical Imaging, 18 (7), pp 628-639, July 1999; incorporated herein by reference). The matching criteria of the reference was $R_t=1.3 R_L$ where $R_L$ is the mass radius. The matching criteria for this example are $R_L \epsilon \{R_t \epsilon 0.4, R_t+0.4\}$. All radii are in millimeters (mm).

The results of the matched scale are presented with detection parameters for a design $pfa_d=0.2$, $N_{OR}=1000$ and confidence $\alpha=0.99$. The number of highest ranked crossing rates is $\tau_r=10$. Having a low design pfa results in a high threshold. If a mass signal-to-noise ratio (SNR) is small, low pfa (large $\tau$) can lead to a missed detection. To reduce the possible number of missed detections, the design pfa is set relatively high. The large number of pixels in the outer ring 64 leads to an accurate estimate of the threshold. The choice of $\tau_r$ can result in a worst case FPR of 10, a result too high. However, regions with high relative intensities would tend to produce high crossing rates in a localized area, and thus should have a high rank thereby leading to a lower FAR.

In further support of the example above, thirty images containing thirty one lesions from the data base are detailed below (See Fyzodeen Khan, Ashwin Sarma, Ying Sun and Donald Tufts "Mass Detection Using Tolerance Intervals and a Rank Detector" pp 185-187; incorporated herein by reference).

The mammograms used contain the smallest lesions in MIAS, with the largest having radius 8 mm and smallest radius 3 mm. Images without calcifications were used. The mammograms contained benign and malignant masses in different backgrounds.

Figure 5:
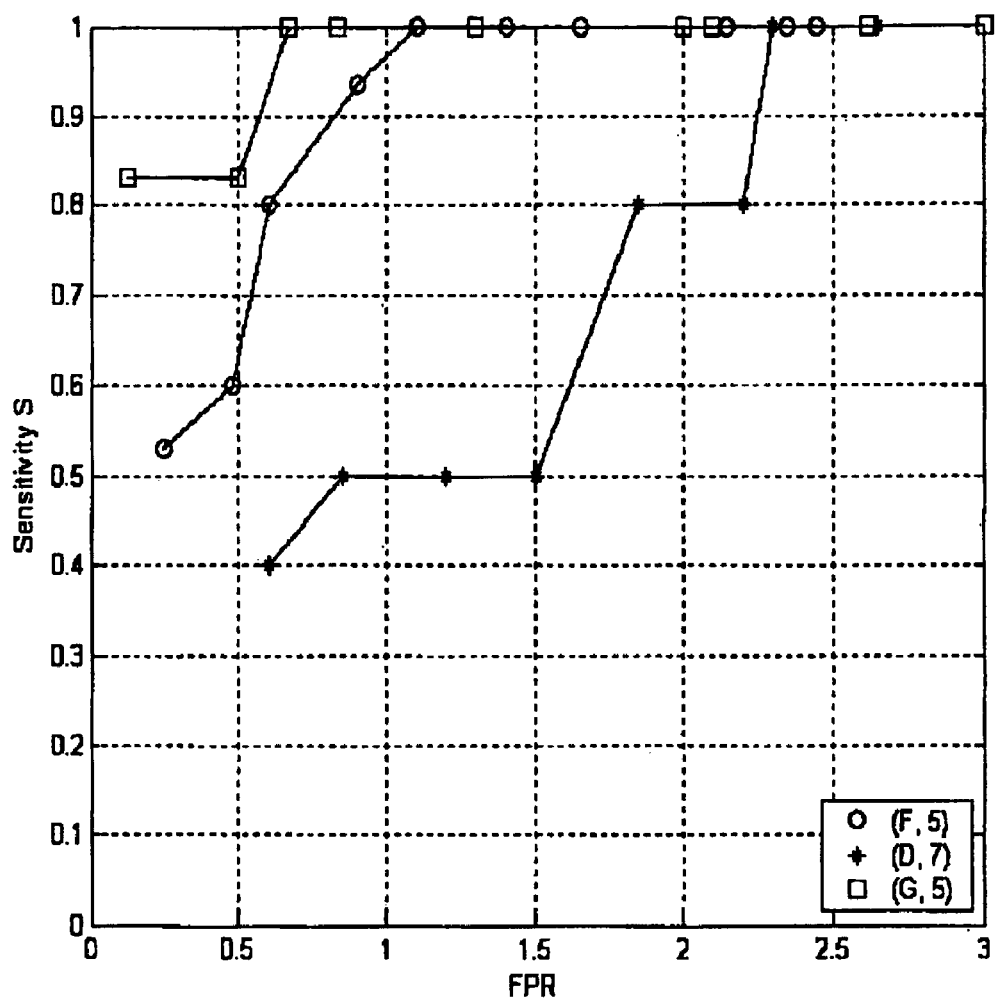
FIG. 5 depicts ROC curves for three background types.

FIG. 5 depicts ROC curves for the three background types. Specifically the chart of FIG. 5 reflects conditional ROC curves at $pfa_d=0.2$ for different background tissue type. Legend indicates first the background type and second the rank at which S=1.

The following, Table 1 indicates the minimum, maximum and average rank of the $\tau_r$ largest ranks for the different template radii and background tissue type. Also shown are FPR and area $A_z$. The sensitivity is S=1 for each case with the largest FPR=2.5 and lowest FPR=0.33. For $R_t=3$ mm, there was only one image in the database so no ROC curve can be computed. FPR=4 and S=1 for this case. At the design $pfa_d$, masses in a dense background were the most difficult to detect with a measured FPR of 2.3 per image. Over all radii, the minimum rank of the $\tau_r=10$ ranks is 7 with maximum rank 1, indicating that for the images analyzed, the highest ranked pixel crossing rate M was located within the mass.

TABLE 1

| Case | Max | Min | Avg | FPR | $A_z$ |
| --- | --- | --- | --- | --- | --- |
| 4 mm | 1 | 5 | 2.5 | 1.50 | 0.88 |
| 5 mm | 1 | 7 | 4.0 | 2.50 | 0.66 |
| 6 mm | 1 | 4 | 1.8 | 1.17 | 0.93 |
| 7 mm | 1 | 3 | 1.3 | 0.33 | 0.99 |
| 8 mm | 1 | 5 | 2.7 | 1.50 | 0.80 |
| F | 1 | 5 | 2.1 | 1.20 | 0.92 |
| D | 1 | 7 | 3.5 | 2.30 | 0.74 |
| G | 1 | 3 | 1.3 | 0.67 | 0.98 |

Figure 6:
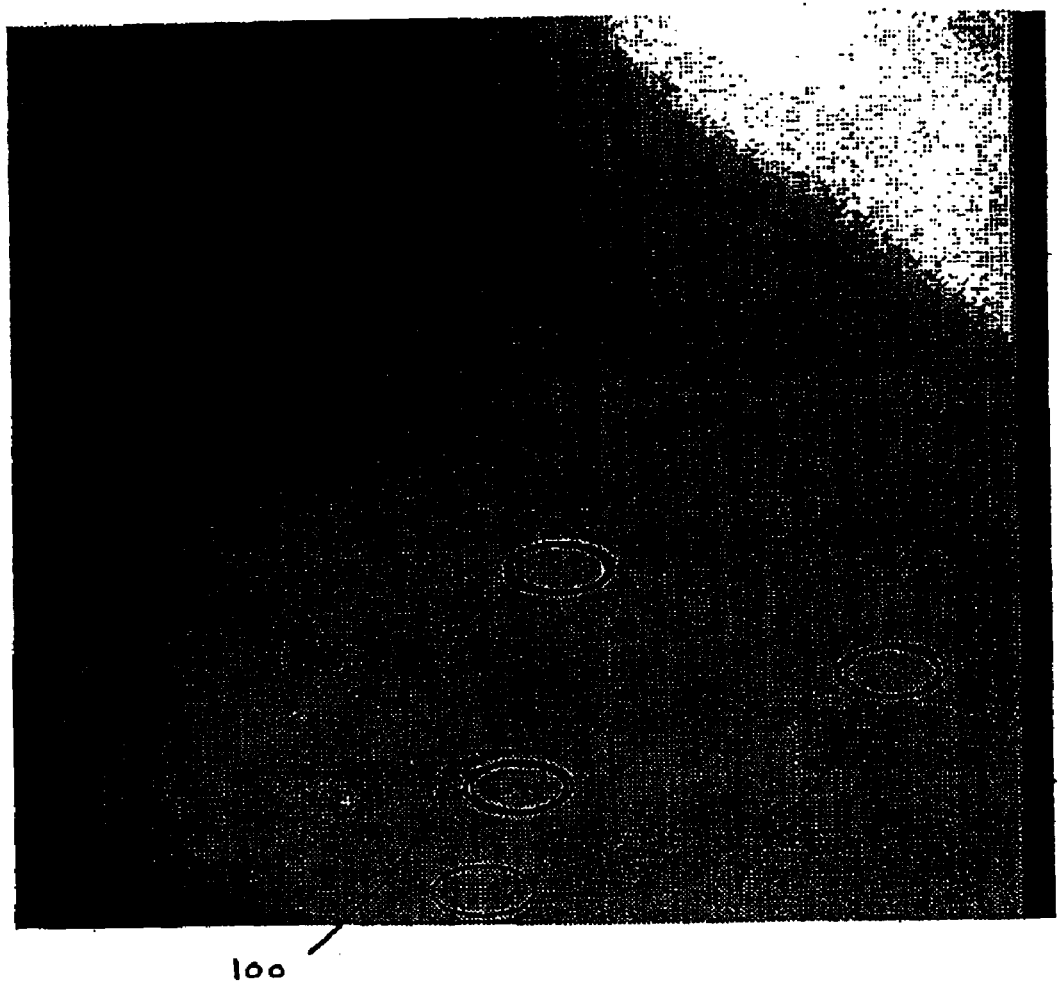
FIG. 6 depicts a processed image of a mammogram with false regions and lesions indicated.

FIG. 6 is the example image from the database processed by the detector. The image shows three false regions 100, 110, 120 and the detected lesion 130. The lesion 130 was the second highest rank of the ten highest ranks. Three detections of the ten highest ranks belonged to the lesion 130. Two other regions each had three detections within the top ten.

A multiscale detector based on template matching and tolerance intervals was implemented and analyzed using a set comprising mammograms with lesions less than 8 mm radius. The lesions had different morphological characteristics in different types of background tissue types. The detector results are presented for the matched single scale only. The detector achieves S=1 in all cases. The FPR at each scale was less than 3 for all cases evaluated when choosing a maximum of $\tau_r=10$ ranks. The average False Positive Rate, $\overline{FPR}$, over all radii, is 1.4 per image and average rank is 2.46. That is, the detected region containing the abnormal mass was ranked within the top three of the $\tau_r=10$ ranks. The average area, over all radii, under the ROC curve is $\overline{A_z}=0.85$.

ROC curves, conditioned on $R_t$, to determine performance in different background tissue types show that worst case performance occurs for lesions in dense backgrounds. Worst case FPR was 2.3 per image with S=1 for dense mammograms. It must be noted that only a detector is implemented. Improved performance may also be achieved by processing all pixels instead of tessellating at $R_t/4$ since this may increase the rank of the number of threshold crossing M corresponding to the lesion without necessarily increasing the FPR.

Choice of $\tau_r$ was done by arguing that high intensity regions should yield threshold crossing rates that are large enough to be within the top ten ranks. Design of this threshold can also be accomplished through more rigorous means using, possibly using nonparametric methods. Further reductions in FPR can be achieved by applying clustering and classification algorithms on the detected regions.

Nonparametric tolerance intervals allow inference without having any knowledge of the distribution from which data is drawn (See J. W. Pratt and J. D. Gibbons, "Concepts of Nonparametric Theory", Berlin, Germany, Springer-Verlag, 1981; incorporated herein by reference). The nonparametric detector, based on tolerance intervals, avoids the assumption of an underlying pdf and therefore absolute thresholds. Combined with the ranking of the threshold crossing rates, good ROC performance was achieved on all test mammograms. Background training data is extracted from the outer ring of a circular template and used to compute a detection threshold. The data within the inner disk of the template is then tested. The proposed detector does show promise in having a low false positive rate and a high sensitivity.

The major advantages of this new method are the ability to train using local background data from the image itself; is computationally simpler than ANNs with no nonlinear optimization problems and provides competitive performance. The method is based on statistical principles and allows for local background data to be arbitrarily distributed, a real possibility when dealing with complex images. The statistical basis helps prevent "overtraining".

The nonparametric nature of the method prevents the need for unwarranted and unnecessary assumptions on the local background data. Beyond the use for mammograms, the method can be applied to any multi-dimensional intensity image in which there can exist at least one region of interest with the shape approximately known. The size of the region needs only to be known within a range.

Thus by the present invention its objects and advantages are realized and although preferred embodiments have been disclosed and described in detail herein, its scope should be determined by that of the appended claims.

What is claimed is:

1. A method for detection and identification of regions of concern of a multi-intensity image, said method comprising the steps of:
   providing the multi-intensity image;
   specifying a shape of at least one template for application to the multi-intensity image;
   designing an outer region of the at least one template to include a number of outer region data points;
   identifying an inner region of the at least one template as an area encompassed by the outer region;
   assigning data points for the inner region;
   estimating a statistical structure of background intensity from the outer region with a tail of a local probability density function using tolerance intervals;
   constructing a one-sided interval based on an ascending order statistic of the outer region data points such that a probability mass within the interval is less than the tail;
   estimating a threshold that represents the data points in the outer region for a specified location within the multi-intensity image with the estimated threshold based on the constructed one-sided interval;
   tessellating the at least one template to additional locations within the multi-intensity image and repeating said statistical structure estimating step, said interval constructing step and said threshold estimation step at each additional location;
   determining a plurality of threshold-crossing rates that represent the data points within the inner region wherein each threshold-crossing rate is the ratio of data points within the inner region greater than the threshold for each location divided by the area of the inner region;
   computing a centroid of threshold crossings of the data points of the inner region in relation to the estimated threshold for each location such that false negatives and false positives of the threshold crossing rates are determined;
   ranking the plurality of threshold-crossing rates in ascending order with the computed centroids corresponding to the plurality of threshold-crossing rates of said ranking such that each rank identifies a region;
   agglomerating the highest ranked regions as detected regions of concern; and
   representing the detected regions of concern as a processed image.

2. The method in accordance with claim 1 wherein said ranking step results in at least two ranked threshold-crossing rates as the identified region such that said agglomerating step includes starting at the highest ranked region and sequentially moving down to lower ranks using a first distance wherein the computed centroid of a second highest rank within a second distance of a highest ranked centroid is labeled to a region of the highest ranked centroid; and
   wherein said agglomerating step is repeated for each of the ranks to the lowest ranks such that the ranks identify a set of regions separated by the first distance.

3. The method in accordance with claim 1 wherein the shape of the at least one template is matched to a specific morphology within the multi-intensity image.

4. The method in accordance with claim 1 wherein the one-sided interval is constructed such that the probability mass within the interval is equal to the tail.

5. The method in accordance with claim 4 wherein said ranking step results in at least two ranked threshold-crossing rates as the identified region such that said agglomerating step includes starting at the highest ranked region and sequentially moving down to lower ranks using a first distance wherein the computed centroid of a second highest rank within a second distance of a highest ranked centroid is labeled to a region of the highest ranked centroid; and
   wherein said agglomerating step is repeated for each of the ranks to the lowest ranks such that the ranks identify a set of regions separated by the first distance.

6. The method in accordance with claim 4 wherein the shape of the at least one template is matched to a specific morphology within the multi-intensity image.

7. The method in accordance with claim 1 wherein the threshold-crossing rates are determined by representing the data points within the inner region wherein each threshold-crossing rate is the ratio of data points within the inner region equal to the threshold for each location divided by the area of the inner region.

8. The method in accordance with claim 7 wherein said ranking step results in at least two ranked threshold-crossing rates as the identified region such that said agglomerating step includes starting at the highest ranked region and sequentially moving down to lower ranks using a first distance wherein the computed centroid of a second highest rank within a second distance of a highest ranked centroid is labeled to a region of the highest ranked centroid; and
   wherein said agglomerating step is repeated for each of the ranks to the lowest ranks such that the ranks identify a set of regions separated by the first distance.

9. The method in accordance with claim 7 wherein the shape of the at least one template is matched to a specific morphology within the multi-intensity image.

10. The method in accordance with claim 7 wherein the one-sided interval is constructed such that the probability mass within the interval is equal to the tail.

11. The method in accordance with claim 10 wherein said ranking step results in at least two ranked threshold-crossing rates as the identified region such that said agglomerating step includes starting at the highest ranked region and sequentially moving down to lower ranks using a first distance wherein the computed centroid of a second highest rank within a second distance of a highest ranked centroid is labeled to a region of the highest ranked centroid; and
   wherein said agglomerating step is repeated for each of the ranks to the lowest ranks such that the ranks identify a set of regions separated by the first distance.

12. The method in accordance with claim 10 wherein the shape of the at least one template is matched to a specific morphology within the multi-intensity image.

13. A method for detection and identification of regions of concern of a multi-intensity image, said method comprising the steps of:
   providing the multi-intensity image;
   specifying a shape of at least one template for application to the multi-intensity image;

designing an outer region of the at least one template to include a number of outer region data points;

identifying an inner region of the at least one template as an area encompassed by the outer region;

assigning data points for the inner region;

estimating a statistical structure of background intensity from the outer region with a tail of a local probability density function using tolerance intervals;

constructing a one-sided interval based on an ascending order statistic of the outer region data points such that a probability mass within the interval is less than the tail;

estimating a threshold that represents the data points in the outer region for a specified location within the multi-intensity image with the estimated threshold based on the constructed one-sided interval;

determining a threshold-crossing rate that represents the data points within the inner region based on the specified location wherein the threshold-crossing rate is the ratio of data points within the inner region greater than the threshold for the specified location divided by the area of the inner region;

computing a centroid of threshold crossings of the data points of the inner region in relation to the estimated threshold at the specified location such that false negatives and false positives of the threshold crossing rates are determined;

assigning a region based upon the computed centroid as a detected region of concern; and representing the detected regions of concern as a processed image.

14. The method in accordance with claim 13 wherein the one-sided interval is constructed such that the probability mass within the interval is equal to the tail.

15. The method in accordance with claim 13 wherein the threshold-crossing rates are determined by representing the data points within the inner region wherein each threshold-crossing rate is the ratio of data points within the inner region equal to the threshold for each location divided by the area of the inner region.

16. The method in accordance with claim 15 wherein the one-sided interval is constructed such that the probability mass within the interval is equal to the tail.

* * * * *